(12) United States Patent　　　(10) Patent No.:　US 12,575,491 B2

Offerdahl et al.　　　　　　　　(45) Date of Patent:　　Mar. 17, 2026

(54) LEAF HARVESTER SYSTEM

(71) Applicants:David Offerdahl, Yuma, AZ (US);
　　　　　　Jordan Egan, Pocatello, ID (US)

(72) Inventors: David Offerdahl, Yuma, AZ (US);
　　　　　　Jordan Egan, Pocatello, ID (US)

( * ) Notice:　　Subject to any disclaimer, the term of this
　　　　　　patent is extended or adjusted under 35
　　　　　　U.S.C. 154(b) by 721 days.

(21) Appl. No.: 17/943,088

(22) Filed:　　Sep. 12, 2022

(65)　　　　　Prior Publication Data

US 2024/0081183 A1　　Mar. 14, 2024

(51) Int. Cl.
　　*A01D 41/12*　　　　　(2006.01)
(52) U.S. Cl.
　　CPC .................................... *A01D 41/12* (2013.01)
(58) Field of Classification Search
　　CPC .................................................... A01D 41/12
　　See application file for complete search history.

(56)　　　　　　References Cited

U.S. PATENT DOCUMENTS

| | | | |
|---|---|---|---|
| 2,718,744 A | | 9/1955 | Phillips |
| 2,737,006 A | | 3/1956 | Klingler |
| 3,608,597 A | * | 9/1971 | Hill ......................... A01D 45/10 |
| | | | 241/79 |
| 3,945,402 A | * | 3/1976 | Murphy .................... F15D 1/06 |
| | | | 138/44 |
| 4,288,970 A | * | 9/1981 | Wilde .................. A01D 45/007 |
| | | | 56/327.2 |
| 4,430,849 A | | 2/1984 | Wilson et al. |
| 4,730,444 A | | 3/1988 | Leffel et al. |

| | | | |
|---|---|---|---|
| RE32,679 E | | 5/1988 | Brooks |
| RE34,678 E | | 8/1994 | Fischer et al. |
| 5,799,474 A | | 9/1998 | Ingram |
| 6,050,073 A | * | 4/2000 | Nevarez, Sr. ........ A01D 45/263 |
| | | | 56/14.4 |
| 6,058,690 A | * | 5/2000 | Rutt ...................... A01D 57/10 |
| | | | 56/327.1 |
| 6,964,152 B2 | | 11/2005 | de Groot |
| 9,167,747 B1 | * | 10/2015 | Andros .................. A01D 33/06 |
| 9,480,203 B2 | | 11/2016 | Cavkusic et al. |
| 2003/0079453 A1 | * | 5/2003 | Groot ..................... A01D 45/28 |
| | | | 56/16.5 |
| 2003/0182920 A1 | * | 10/2003 | Maconachy ......... A01D 45/001 |
| | | | 56/327.1 |
| 2004/0022620 A1 | * | 2/2004 | Maconachy ........... A01D 45/26 |
| | | | 414/800 |
| 2005/0055993 A1 | * | 3/2005 | Maconachy ......... A01D 45/001 |
| | | | 56/9 |
| 2009/0044507 A1 | * | 2/2009 | Erhart .................... A01D 91/04 |
| | | | 56/14.5 |

(Continued)

FOREIGN PATENT DOCUMENTS

| | | | | |
|---|---|---|---|---|
| CN | 104429352 | | 3/2015 | |
| EP | 3443835 A1 | * | 2/2019 | ........... A01F 12/385 |
| WO | PCT/AU92/00376 | | 2/1993 | |

*Primary Examiner* — Claude J Brown

(74) *Attorney, Agent, or Firm* — Progress Patent Law,
PLLC; David R. McKinney

(57)　　　　　　　ABSTRACT

A leaf harvester includes a mobile vehicle, configured for
moving on ground, having a leaf cutter at a front thereof, a
first conveyor, and a laminar flow air conveyor, disposed
between the leaf cutter and the first conveyor. The laminar
flow air conveyor has a sloped upper surface, and is con-
figured to rearwardly discharge a laminar flow of air over the
upper surface to propel leaves cut by the leaf cutter to the
first conveyor.

20 Claims, 5 Drawing Sheets

(56)  References Cited

U.S. PATENT DOCUMENTS

| | | | | |
|---|---|---|---|---|
| 2009/0230725 | A1* | 9/2009 | Juieng | B62D 35/00 |
| | | | | 296/1.01 |
| 2012/0273070 | A1* | 11/2012 | Freers | B05B 1/044 |
| | | | | 137/565.01 |
| 2018/0012344 | A1* | 1/2018 | Jens | G06T 7/0004 |
| 2018/0249634 | A1* | 9/2018 | Morris | A01F 12/00 |
| 2020/0140200 | A1* | 5/2020 | Boerhof | B65G 21/209 |

* cited by examiner

LEAF HARVESTER SYSTEM

BACKGROUND

Field of the Invention

The present application relates generally to agricultural equipment. More particularly, the present application relates to a leaf harvester having a laminar flow air conveyor for transporting cut leaves to a receiving conveyor.

Related Art

In recent years there has been an increased demand for and production of "baby" leaves—that is, very young and tender leaves of green vegetables, such as spinach, "spring mix" varieties, lettuce, kale, etc. To harvest these types of crops, baby leaf mechanical harvesters were developed in the late 1990's, and are now widely used.

Mechanical baby leaf harvesters that are now known typically use a blade (e.g. a bandsaw blade) to cut leaves from the plants very close to the ground. A pick-up conveyor belt is positioned close behind the blade to receive the leaves after cutting. Because the leaves are cut so closely to the ground, in these prior systems the nose end of the pick-up conveyor belt turns around a very small (e.g. ½ " to ¾ " diameter) non-rotating nosebar, positioned just behind the blade. For this reason, the pick-up conveyor belt is an endless or seamless belt (i.e fabricated in one piece, without any joints).

This configuration presents several challenges. First, because the nosebar does not rotate, there is relatively high friction between the moving conveyor belt and the nosebar. For this reason, most known leaf harvesting machines use water to lubricate the belt/nosebar interface, which wastes water and adds complexity to the system. Second, endless or seamless belts are significantly more expensive than jointed belts. Additionally, the small nosebar diameter tends to hinder proper tracking of the belt, which can lead to premature failure. Furthermore, conveyor design is more complicated when using an endless belt, and because the nose end of the conveyor is immediately behind the bandsaw blade, the rear edge of the blade can easily contact and damage the belt during operations, thus significantly reducing the useful life of the belt.

The present application is directed to one or more of the above issues.

SUMMARY

It has been recognized that it would be advantageous to have a leaf harvester that can employ a rotating idler roller at the forward end of the pick-up conveyor, rather than a small-diameter nose bar, thus simplifying conveyor design and facilitating positive tracking of the conveyor belt.

It has also been recognized that it would be advantageous to have a leaf harvester that can use jointed belts to reduce costs and increase serviceablity.

It has also been recognized that it would be advantageous to have a leaf harvester that does not require the use of water.

In accordance with one embodiment thereof, the present invention provides a leaf harvester that includes a mobile vehicle, configured for moving on ground, having a leaf cutter at a front thereof, a first conveyor, and a laminar flow air conveyor, disposed between the leaf cutter and the first conveyor. The laminar flow air conveyor has a sloped upper surface, and is configured to rearwardly discharge a laminar flow of air over the upper surface to propel leaves cut by the leaf cutter to the first conveyor.

In accordance with another aspect thereof, the invention provides a pick-up system for a leaf harvester having a front and a conveyor. The pick-up system includes a leaf cutter, disposed at the front, configured to cut leaves as the harvester moves forwardly. An air conveyor is disposed between the leaf cutter and the conveyor, and has a rearwardly sloped upper surface, and a forward air outlet, configured to discharge a laminar flow of air rearwardly over the upper surface, whereby cut leaves landing upon the upper surface are propelled toward the conveyor.

In accordance with yet another aspect thereof, the invention provides an air conveyor system for a leaf harvester having a leaf cutter at a forward end thereof. The air conveyor system includes an air pump, a plenum, and an air outlet in the plenum. The plenum is disposed behind the leaf cutter. It is in fluid communication with the air pump, and has a rearwardly sloped upper surface. The air outlet is disposed at a font edge of the upper surface, and is configured to rearwardly discharge a laminar flow of air over the upper surface, whereby cut leaves landing upon the plenum are propelled rearwardly into the leaf harvester.

BRIEF DESCRIPTION OF THE DRAWINGS

Additional features and advantages of the invention will be apparent from the detailed description which follows, taken in conjunction with the accompanying drawings, which together illustrate, by way of example, features of the invention, and wherein.

DETAILED DESCRIPTION

Figure 1:
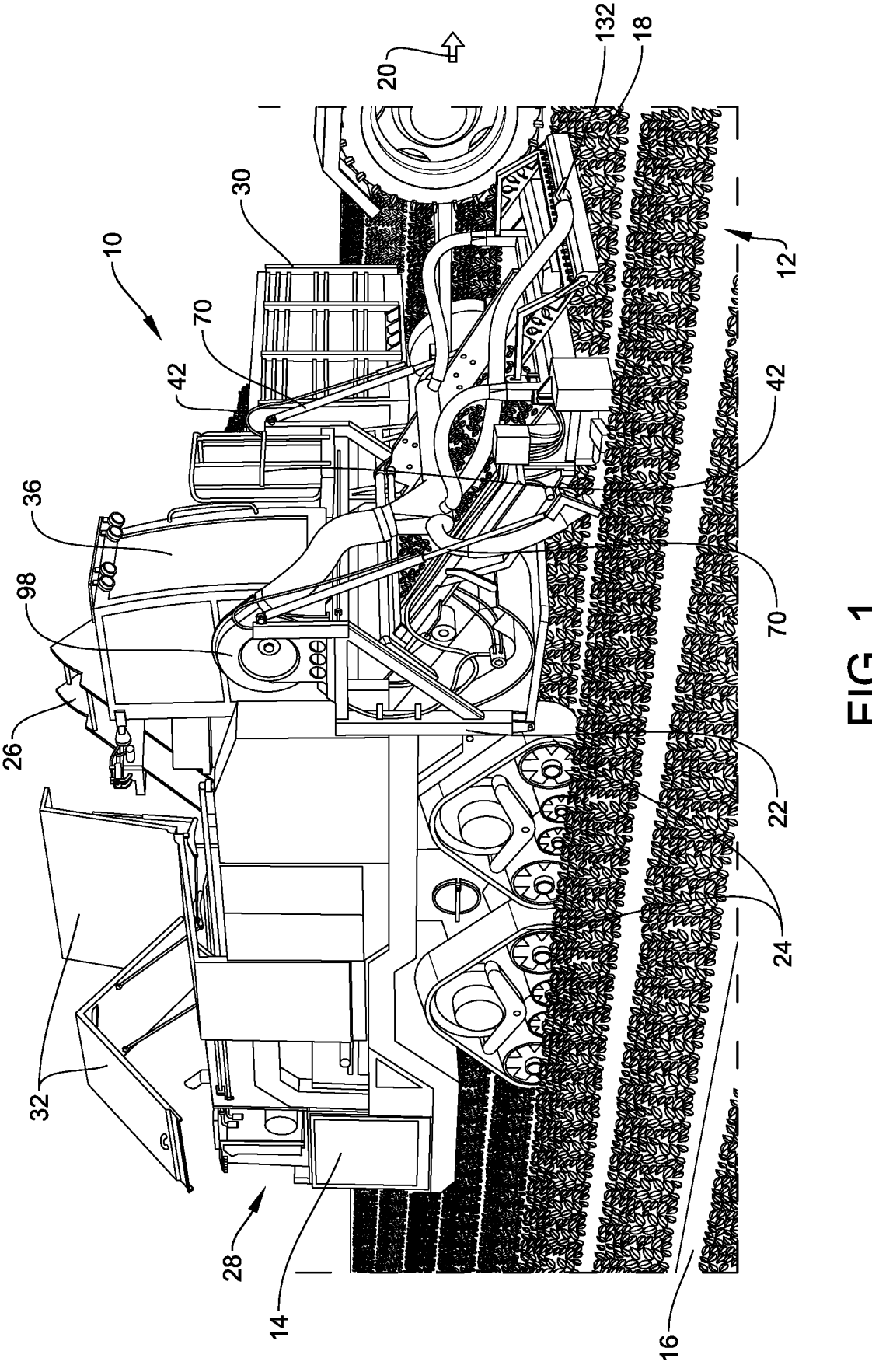
FIG. 1 is a perspective view of a leaf harvester unit having an air conveyor in accordance with the present disclosure.

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

As noted above, baby leaf mechanical harvesters that are widely used for harvesting young leaves of spinach, "spring mix," lettuce, kale, etc. typically employ a small-diameter, non-rotating "nosebar" at the forward end of the pick-up conveyor. This configuration presents a variety of complications, which has been discussed above.

Advantageously, as described herein, a leaf harvesting system has been developed that addresses many of the challenges of prior leaf harvesting systems. Specifically, the leaf cutting and pick-up system disclosed herein employs a laminar-flow air conveyor, positioned between a cutting blade and a pick-up conveyor, thus allowing the forward end of the pick-up conveyor to have a larger diameter and employ a rotating idler roller, rather than a fixed nosebar.

Shown in FIG. 1 is one embodiment of a leaf harvester, indicated generally at 10, that includes an air conveyor pick-up system, indicated generally at 12, in accordance with the present disclosure. The leaf harvester 10 generally comprises a mobile vehicle 14 configured to move along the ground 16 in a field of crops 18 in a harvesting direction, indicated generally by arrow 20. The vehicle 14 generally includes a vehicle frame 22, which is supported on the ground 16 on wheels or tracks 24 (or other suitable propulsion devices), with a motor (not shown) that is coupled to the wheels or tracks 24 and configured for propelling the vehicle 14 on the ground 16.

The harvester 10 also includes a discharge conveyor 26 (only partially visible in FIG. 1) that extends upwardly from the rear portion 28 of the vehicle 14 and toward the side of it. This discharge conveyor 26 is configured for discharging cut leaves 42 to a receiving trailer or hopper (such as hopper 30), which is shown moving alongside the harvester 10 in FIG. 1. The harvester 10 of FIG. 1 includes a variety of openable panels 32 that allow access to internal mechanisms, and which provide alternate positions for the discharge conveyor 26, so that harvested leaves 42 may be discharged to either side of the vehicle 14 or to the rear, etc. The harvester 10 also includes a cab 36 in which an operator (not shown) can be provided with controls (not shown) for operating the vehicle 14 and controlling its systems. Those of skill in the art will recognize that the harvester 10 also includes or can include a variety of other features and systems that are well known and common to harvesters generally.

Figure 2:
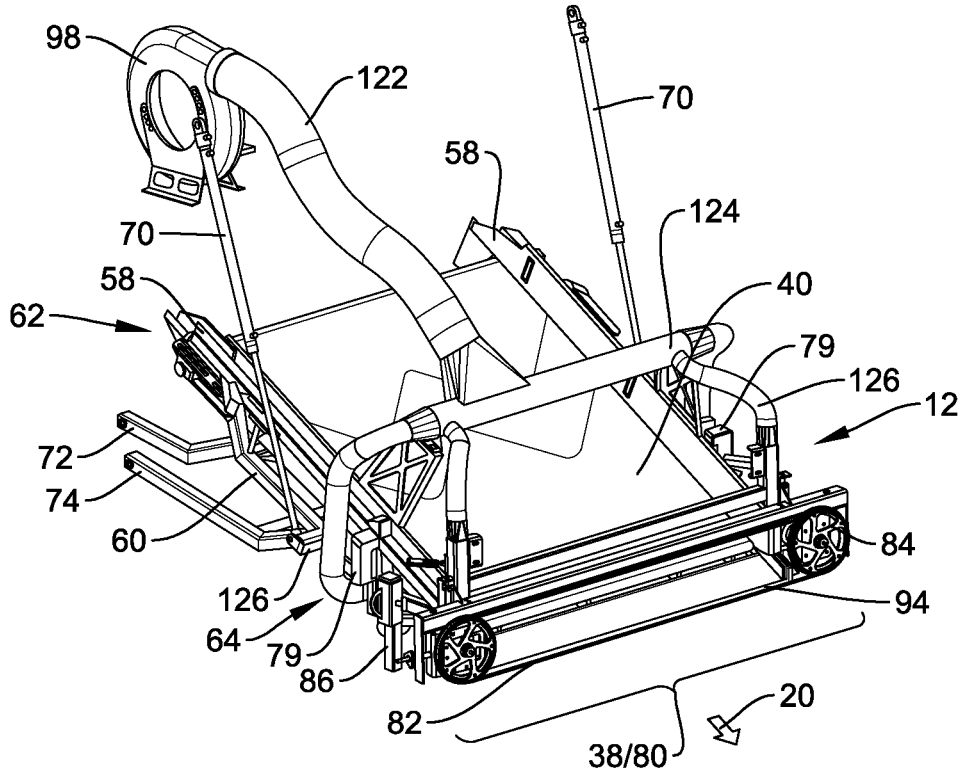
FIG. 2 is a close-up perspective view of the air conveyor of the harvester of FIG. 1.
Figure 3:
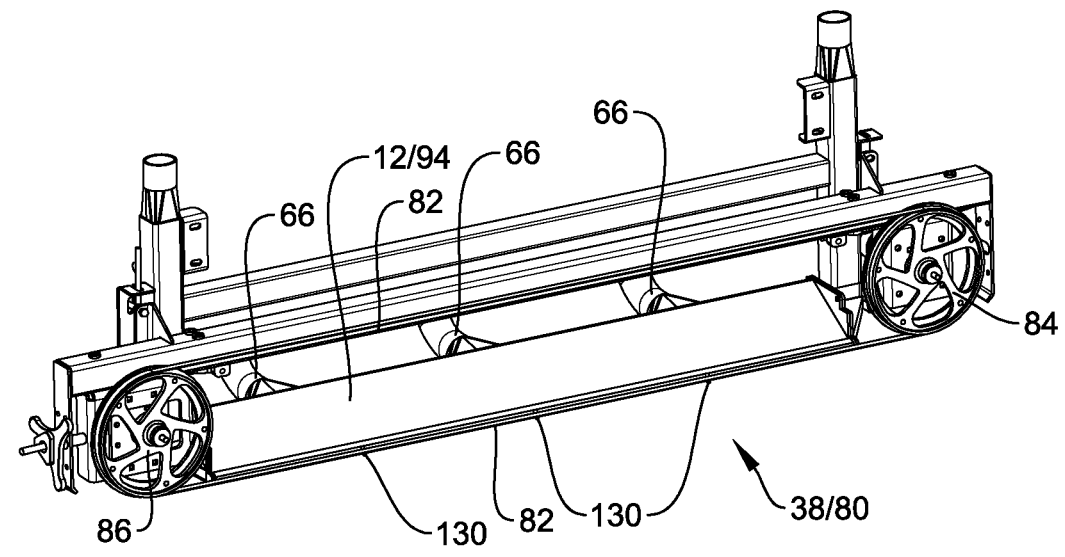
FIG. 3 is a front perspective view of the cutter blade and plenum of the air conveyor.
Figure 4:
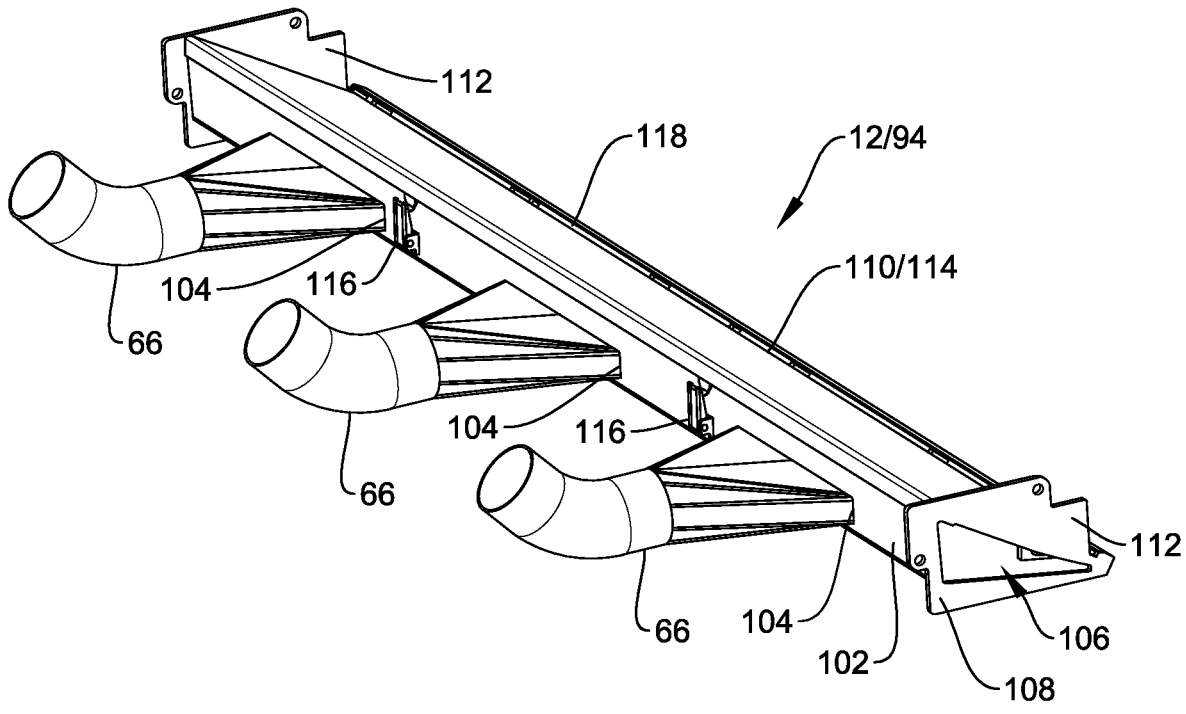
FIG. 4 is a rear perspective view of the plenum of the air conveyor.
Figure 5:
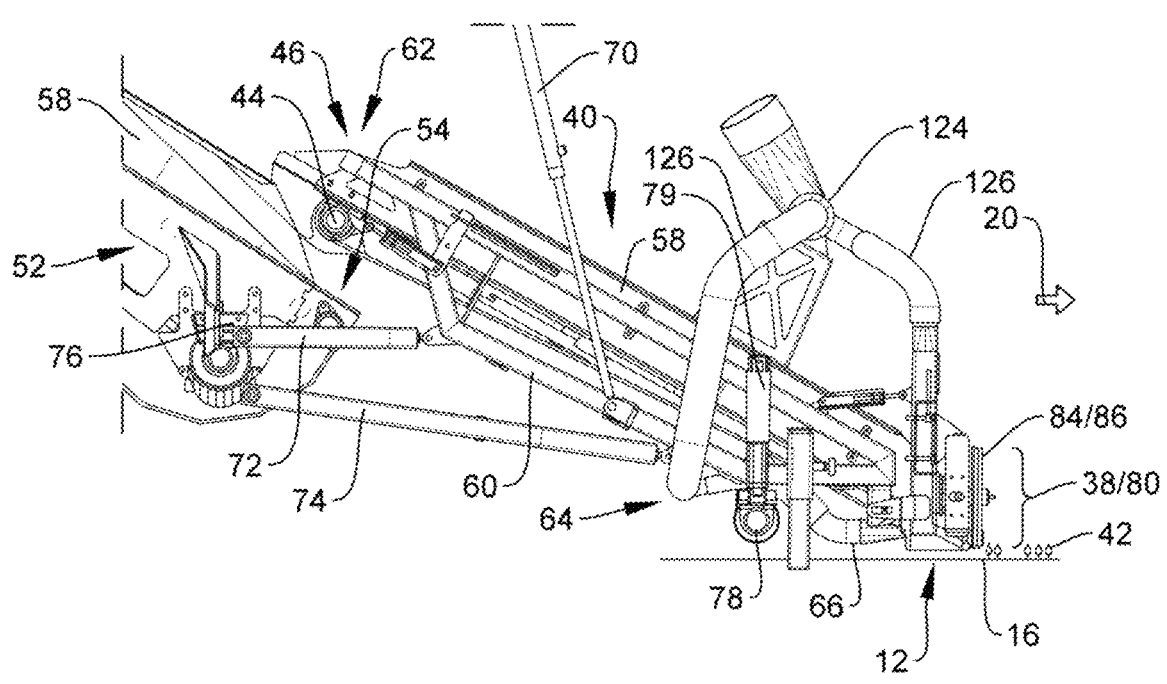
FIG. 5 is a side view of the air conveyor of FIG. 2.

Referring now to FIGS. 1 and 2, disposed at the front of the harvester vehicle 14 is the leaf cutting and pick-up system 12. The leaf cutting and pick-up system 12 generally includes a leaf cutter 38, disposed at the front, a first or receiving conveyor 40 disposed rearwardly of the leaf cutter 38, and the air conveyor 12 disposed between the leaf cutter 38 and the first conveyor 40. With reference to FIGS. 1 and 5, the first conveyor 40 includes a drive roller 44 at its upper rearward end 46, and an idler roller 48 at its lower forward end 50. The drive roller 44 can be driven by a hydraulic or electric motor (not shown) that is powered by the harvester 10.

The leaf harvesting system also includes a second conveyor 52, disposed rearwardly of the first conveyor 40. The rearward end 46 of the first conveyor 40 overlaps the forward end 54 of the second conveyor 52, so that leaves 42 discharged from the rearward end 46 of the first conveyor 40 will fall onto the forward end 54 of the second conveyor 52. The second conveyor 52 thus receives cut leaves 42 from the first conveyor 40, and transports them rearwardly within the harvester vehicle 14 to internal mechanisms (not shown) that ultimately direct the cut leaves 42 to the discharge conveyor 26. Both the first conveyor 40 and second conveyor 52 include sidewall panels 58 extending upwardly along the lateral sides of the respective conveyor belts, for retaining the harvested leaves 42 on the respective belts.

As shown in FIGS. 1, 2 and 5, the leaf cutting and pick-up system, including the leaf cutter 38, the air conveyor 12 and the first conveyor 40, are coupled to the harvesting vehicle 14 via a moveable pick-up system frame 60. The rear end 62 of the pick-up system frame 60 is hingedly connected to the harvester vehicle frame 22 at a position that is generally concentric with the rear drive roller 44 of the first conveyor 40. A forward portion 64 of the pick-up system frame 60 is hingedly connected to an upper portion of the front of the harvester frame 22 via a lifting mechanism 70, such as hydraulic cylinders. The pick-up system frame 60 is also connected via pivoting linkages 72 and 74 to the frame 76 of the second conveyor 52.

Advantageously, the pick-up system frame 60 also includes, toward its forward portion 64, a ground gauge roller 78 that is attached to a ground gauge depth actuator 79. The depth actuator 79 can be an electromechanical actuator or a hydraulic cylinder for example. A ground gauge roller 78 and corresponding depth actuator 79 can be provided on each side of the pick-up system frame 60, and these can be independently or simultaneously controlled by an operator. The ground gauge rollers 78 contact the ground 16 as the leaf harvester vehicle 14 moves through the field, their position being governed by the ground gauge depth actuators 79 (in combination with the lifting mechanism 70). When the depth actuators 79 are extended, this causes the ground gauge rollers 78 to push against the ground 16 and thereby lift the forward end 64 of the pick-up system frame 60. This will increase the height of cut of the leaf-cutting system 12. When the depth actuators 79 are retracted, this lowers the pick-up system frame 60, and thus decreases the height of cut.

These features keep the first conveyor 40 and second conveyor 52 in a desired relative position, while also allowing an operator of the harvester 10 to selectively raise or lower the common pick-up system frame 60 to a desired height above the ground 16. For example, for harvesting crops 18, the front end of the pick-up system 12 is lowered close to the ground 16 to an appropriate harvesting height, which can vary depending on the type of crop and other factors. During harvesting operation, the height of the pick-up system 12 is governed by the lifting mechanism 70 and the ground gauge rollers 78. On the other hand, for transporting the harvester vehicle 14, the pick-up system frame 60 can be lifted high above the ground 16 via the lifting mechanism 70 to increase ground clearance and to avoid obstacles and prevent damage to the harvester 10 or other objects.

As shown in FIGS. 2-3 and 5-7, in the embodiment disclosed herein the leaf cutter 38 is a horizontally oriented bandsaw 80. The bandsaw 80 includes an endless blade 82, wrapped around a pair of opposing wheels or pulleys (including a drive pulley 84 and an idler pulley 86), with a toothed cutting edge 90 on the front of the blade 82, and a smooth surface on the rear edge 92 of the blade 82. The bandsaw 80 is configured for cutting leaves 42 as the harvester 10 moves forwardly (i.e. in the harvesting direction 20) through the field. Advantageously, the moveable pick-up system frame 60 is adjustable so that the height of the blade 82 can be adjusted from being against the ground 16, to any desired raised height. The drive pulley 84 of the bandsaw 80 is coupled to a hydraulic or electric motor (not shown), which receives power from the harvester 10. Those of skill in the art will recognize that leaf cutting devices other than a bandsaw can also be used with this type of harvester.

As can be seen in FIGS. 2-7, disposed behind the leaf cutter blade 82 and in front of the forward end 50 of the first conveyor 40 is the air conveyor system, indicated generally at 12. As the harvester 10 moves forward in the harvesting direction 20 and the cutting blade 82 cuts leaves 42, the forward motion will naturally tend to push the cut leaves 42 onto the air conveyor system 12. That is, as leaves 42 are cut, oncoming leaves 42 that are not yet cut will push the cut leaves 42 past the blade 82 and onto the air conveyor 12. This function is quite consistent because there is little or no gap between the cutting blade 82 and the air conveyor 12.

Figure 7:
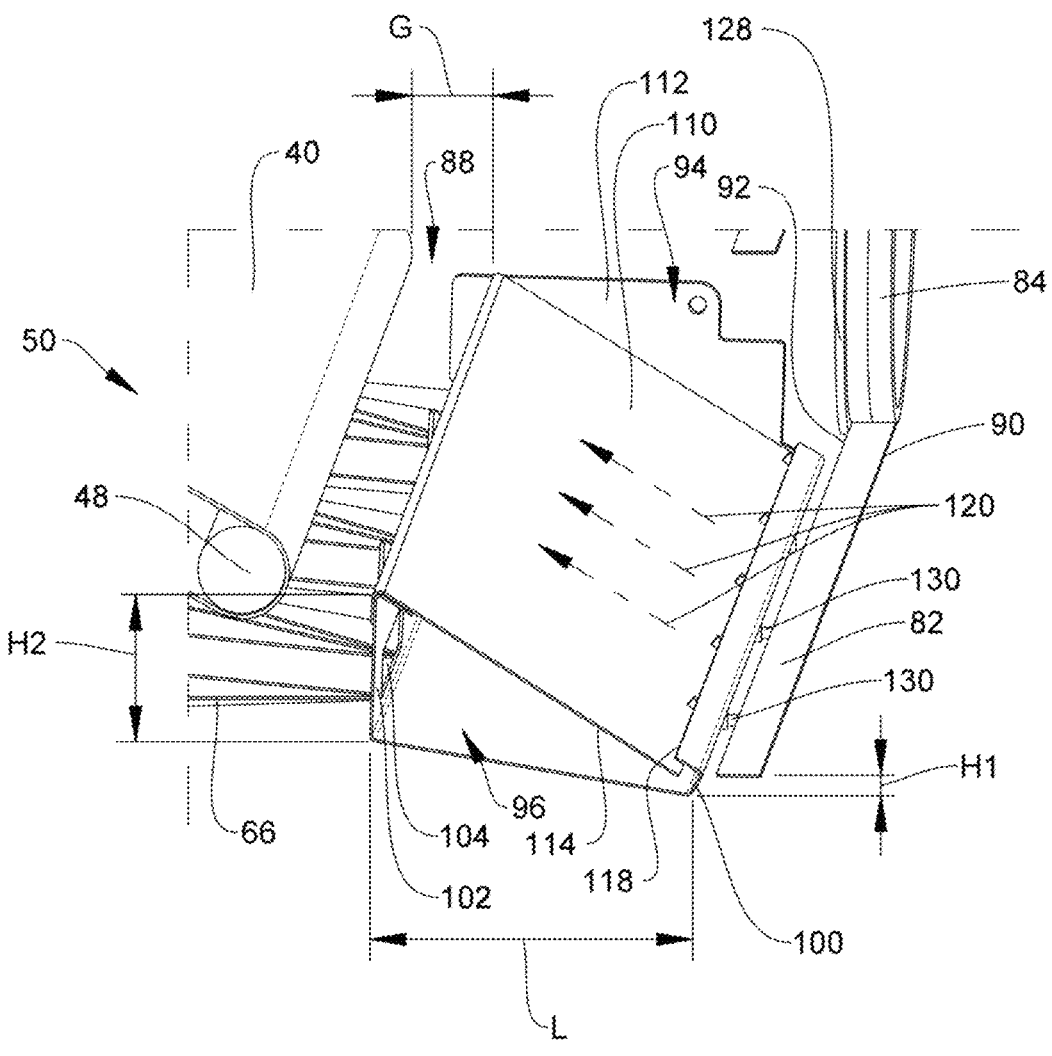
FIG. 7 is a close-up side, cross-sectional view of the air conveyor of FIG. 2, showing details of the air conveyor.

However, as shown in FIG. 7, there is a gap 88 between the rearward end of the air conveyor 12 and the forward end 50 of the first conveyor 40. In the embodiment shown, this gap 88 can have a length G of about 1" to 4", but this length can vary, depending on the geometry of a particular embodiment. The purpose of the gap 88 is to allow any heavy debris to drop out of the stream of cut leaves 42, before being passed on to the first conveyor 40. It is to be appreciated that the size of this gap 88 can be increased or reduced to suit particular harvest conditions. Advantageously, the air conveyor 12 is configured to propel cut leaves 42 rearwardly across the gap 88, so that they land upon the first conveyor 40. The air conveyor 12 includes a generally horizontally oriented plenum 94, having an enclosed interior space or volume 96 that is in fluid communication with an air pump 98 that is attached to the harvester frame 22, drawing power from the harvester 10. The plenum 94 has a generally wedge-shaped cross-section, which is thinner at the front wall 100 and thicker at the rear wall 102, with a plurality of rear air inlets 104 in the rear wall 102 and side air inlets 106 in its side walls 108. The rear air inlets are fed by rear air conduits 66, as described in more detail below.

The plenum 94 has a sloped upper surface 110, with upstanding side panels 112 at the lateral sides of the plenum 94. The side panels 112 extend above the sloped upper surface 110, and help keep cut leaves 42 from falling off of the lateral sides of the air conveyor 12, prior to transport to the first conveyor 40.

The sloped upper surface 110 is provided by an upper panel 114. This panel 114 can be textured or smooth, and it is desirable that the upper surface 110 have a non-stick property. In one embodiment, the upper panel 114 is of stainless steel with a dimpled textured surface. In the embodiment shown herein, the upper panel 114 is removably attached to the body of the plenum 94 via clips 116 or other releasable attachment devices, so that the upper panel 114 can be easily removed for cleaning or to allow access to the interior space 96 of the plenum 94. To provide the desired motion of the cut leaves 42, the upper surface 110 is sloped rearwardly upward. The angle θ of this slope can be in the range of 15° to 40°, and more particularly in the range of 25° to 35°, though other angles can be used, depending on the specific geometry of a given system.

Advantageously, the plenum 94 includes an elongate air outlet 118 located at the top of its front wall 100, which extends along substantially the entire width of the plenum 94. This air outlet 118 faces rearwardly, and is immediately adjacent to the forward edge of the sloped upper surface 110 of the plenum 94. The elongate air outlet 118 is configured to (i.e. has a size and shape selected to) discharge air 120 (indicated by arrows) from the interior volume 96 of the plenum 94 rearwardly, in the direction of the arrows, over the upper surface 110 in a laminar flow condition. The arrows indicate both the flow 120 of this air and its direction. The operation of the pump 98 and the plenum 94 together rearwardly discharge this laminar flow 120 of air from the elongate air outlet 118 across the upper surface 110. This laminar flow 120 of air causes cut leaves 42 falling toward or landing upon the upper surface 110 to be propelled rearwardly along the upper surface 110 and across the gap 88 to the first conveyor 40. By this laminar flow 120 of air, the cut leaves 42 are transported to the first conveyor 40, and thence further into the leaf harvester 10.

The air pump 98 can be a centrifugal pump, configured to pump a relatively high volume of air at a relatively low pressure. As one example, the pump 98 can be configured to generate up to about 4,500 SCFM (standard cubic feet per minute) at a pressure of up to about 74 in. Hg (about 36 psi). The plenum 94 is coupled to the air pump 98 via a system of air conduits, which connect to the rear inlets 104 and lateral side inlets 106 of the plenum 94. These can include a main or trunk air conduit 122, which extends from the pump 98 and feeds a manifold conduit 124, which divides the air flow into multiple conduits 126 that connect directly or indirectly to the plenum 94, including rear air conduits 66 that lead to the rear air inlets 104 in the rear wall 102 of the plenum. Some or all of these air conduits can be flexible, enabling them to withstand shock and vibration experienced by the harvester 10 during operation, and to facilitate movement of the pick-up system frame 60.

The size of the plenum 94, of the air inlets 104, 106, and of the elongate air outlet 118 are selected in combination with the performance characteristics of the pump 98 to produce the desired laminar outflow characteristics. The plenum 94 serves this function by providing an interior volume 96 in which the air flow and pressure are equalized across the entire width of the plenum 94, so that the desired laminar outflow is achieved across the elongate air outlet 118. In general, any configuration of the plenum 94 that generally equalizes air flow and pressure to provide laminar outflow across the upper surface 110 at a velocity of from 100 mph to 200 mph and at an initial pressure of from about 2 to 5 psi is believed to be suitable. For example, in one general embodiment, the plenum 94 has a width W of about 5½ feet, encloses an interior volume 96 of about 0.5 cu. ft., and the upper surface 110 has a slope θ of about 30°. For desired operation in this embodiment, the pump 98 can provide a flow rate of from about 2000 to about 3500 SCFM, at a pressure of about 2 to 5 psi. This will provide the laminar flow 120 of air having a velocity of about 160 mph over the upper surface 110.

In a more specific embodiment, the plenum 94 has an overall width W of 66.5", a length L (from forward end to rear wall) of 7.18", a forward height H1 of 0.375", and a rear height H2 of 3.32", and defines an interior volume 96 of approximately 793. cu. in. (about 0.46 cu. ft.). The air outlet 118 is as wide as the plenum 94, and has a height of about 0.25 in., giving the outlet 118 a cross-sectional area of about 16.625 in.2. In this embodiment, the air pump 98 is selected to provide a volumetric flow rate of from about 2000 SCFM to 3500 SCFM through the outlet 118 at a pressure of from 5 in. to 10 in. Hg (about 2-½ to 5 psi). This configuration will provide the laminar flow 120 of air having a velocity of about 160 mph over the upper surface 110.

Figure 6:
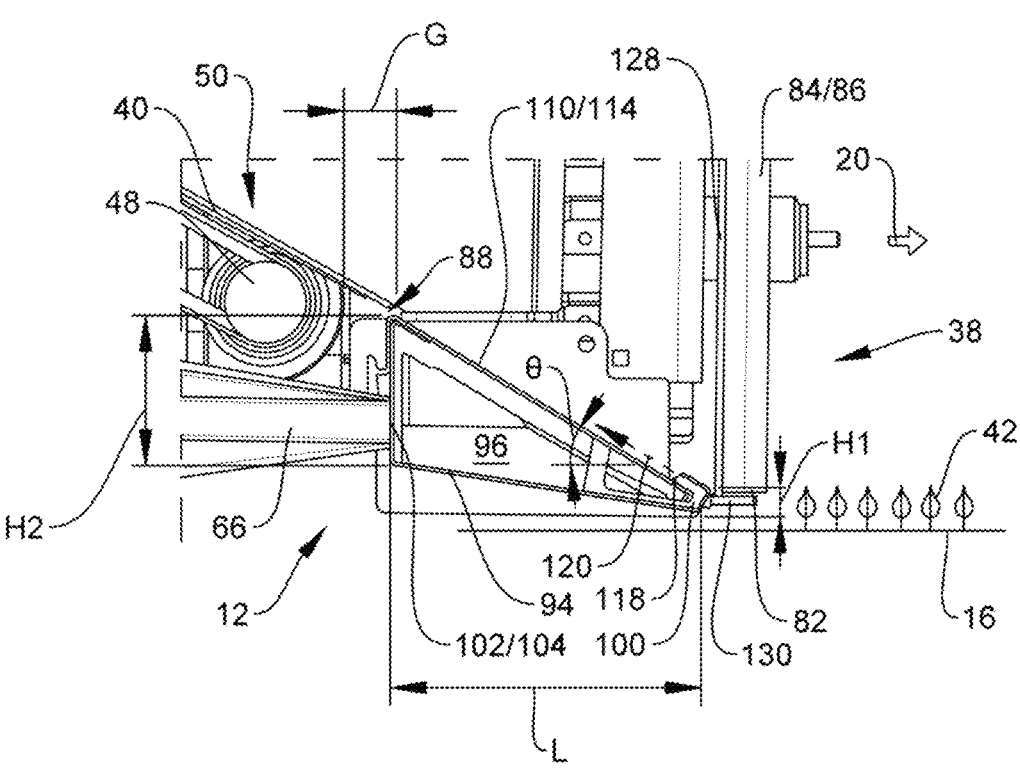
FIG. 6 is a side, cross-sectional view of the leaf harvester and air conveyor in operation, showing the motion of leaves being cut.

Advantageously, the rear height $H_2$ of the rear wall 102 of the plenum 94 allows for a larger (i.e. thicker) forward end 50 of the first conveyor 40, which allows for a larger diameter forward idler roller 48. As shown in FIGS. 6 and 7, the forward roller 48 of the first conveyor 40 is positioned behind the plenum 94, and above the ground 16 and above the rear air conduits 66 and rear air inlets 104 of the plenum 94. Given the need for this clearance, and the desirable characteristics of a first conveyor 40 having an idler roller 48 at the forward end 50, the height $H_2$ of the rear wall 102 of the plenum 94 can be selected to allow the use of a forward idler roller 48 having a diameter of about 2" to about 4".

The desired air flow characteristics for the laminar flow air conveyor 12 can vary depending on atmospheric and other conditions when the harvester 10 is in operation. For, example, temperature, atmospheric pressure, humidity, the type and size of the crop and the presence of dew or
rainwater on the leaves 42 can directly affect the air flow rate
and pressure that may be needed to propel the leaves 42 with
a suitable velocity. Additionally, the speed at which the
harvester 10 is moving through the field will affect the rate
of cutting of leaves 42, and this can also affect the suitable
velocity for propelling the leaves 42. Accordingly, the cab 36
of the harvester 10 can include controls (not shown) that
allow the operator to adjust the performance of the air pump
98 (e.g. flow rate and pressure) to compensate for changes
in these conditions. Additionally, the harvester 10 can
include sensors and gages (not shown) that allow the opera-
tor to monitor these atmospheric and other conditions during
operation.

It will be appreciated that as the harvester 10 moves in the
harvesting direction 20, the crop will be contacted by the
front, cutting edge 90 of the blade 82, which can tend to push
the blade 82 rearwardly and downwardly. As best shown in
FIGS. 6 and 7, the bandsaw pulleys 84, 86 have flanges 128
that guide the blade 82 and help protect the front wall 100
of the plenum 94 from contact with the rear edge 92 of the
blade 82. This helps to prevent or reduce possible damage to
the blade 82 and/or the plenum 94 during operation, and can
thus extend the useful life of the system.

Additionally, the plenum 94 can include one or more
blade guides 130, extending from the front face or front wall
100 of the plenum 94. These blade guides are generally
cylindrical bars that are configured to support the bottom of
the cutting blade 82. It will be appreciated that as the
harvester moves in the forward cutting direction, the crop
will be contacted by the front, cutting edge 90 of the blade
82, which can tend to push the blade downward. The blade
guides 130 are positioned just below the blade 82, and thus
support the blade 82 against this downward force. The blade
guides 130 also help to prevent the blade 82 from detracking
(i.e. coming off of the bandsaw pulleys 84, 86) in the event
that the blade 82 comes into contact with the ground 16 or
other obstacles during operation. It is desirable that the blade
guides 130 be easy to install and remove, and are con-
structed of material having good wear properties, such as
stainless steel or silicon bronze.

A harvester having a leaf cutting and pick-up system 12
in accordance with the present disclosure can also include
other features if desired. For example, the harvester 10
shown in FIG. 1 includes an optional air knife device 132
positioned forward of the cutting blade 82 and pick-up
system 12, and coupled to receive air from the air pump 98.
This air knife 132 is provided for the purpose of fending off
insects immediately prior to cutting of the leaves 42, so as
to reduce the quantity of insects that may be harvested with
the leaves 42. Air knife systems are well known, and their
use in combination with the leaf cutting and pick-up system
12 disclosed herein is not believed to have any significant
effect on the operation of the leaf cutting and pick-up
system.

The leaf cutting and pick-up system 12 disclosed herein
thus provides an innovative design that does away with a
nosebar, as in prior leaf harvesting systems. A controlled and
adjustable flow of air moves through the engineered ducting
and manifolds into the air conveyor plenum 94, where the air
then properly equalizes before exiting rearwardly though the
long and narrow air outlet vent 118 in a laminar flow
condition across the upper surface 110 of the plenum 94 at
a designed angle and speed, thus propelling the cut leaves 42
across a gap 88, then up onto the first conveyor 40.

With this system, the first conveyor 40 can utilize a
rotating idler roller 48 of a relatively large diameter, rather than a very small diameter nosebar, which simplifies con-
veyor design. This configuration promotes positive tracking
of the first conveyor 40, and allows the use of belts fabri-
cated using a belt joining system, which reduces cost and
increases serviceablity, and does not require the use of water.

It is to be understood that the above-referenced arrange-
ments are illustrative of the application of the principles of
the present invention. It will be apparent to those of ordinary
skill in the art that numerous modifications can be made
without departing from the principles and concepts of the
invention as set forth in the claims.

What is claimed is:

1. A leaf harvester, comprising:
   a mobile vehicle, configured for moving on ground,
   having a leaf cutter at a front thereof;
   a first conveyor, having a lower forward end with a
   forward roller; and
   a laminar flow air conveyor, disposed between the leaf
   cutter and the forward roller of the first conveyor,
   having a rear wall defining a gap between the air
   conveyor and the lower forward end, the air conveyor
   having a sloped upper surface, configured to rearwardly
   discharge a laminar flow of air over the upper surface
   to propel leaves cut by the leaf cutter across the gap to
   the lower forward end of the first conveyor.

2. A leaf harvester in accordance with claim 1, wherein the
air conveyor comprises:
   a generally horizontally oriented plenum, having a width
   and defining an interior volume; and
   an elongate air outlet, located at a front end of the plenum,
   extending substantially entirely along the width
   thereof, configured to discharge air from the interior
   volume rearwardly over the upper surface in a laminar
   flow condition.

3. A leaf harvester in accordance with claim 2, further
comprising an air pump, in fluid communication with the
interior volume of the plenum.

4. A leaf harvester in accordance with claim 3, wherein the
air pump is fluidly connected to each lateral side of the
plenum and to a rear of the plenum.

5. A leaf harvester in accordance with claim 2, wherein the
laminar flow condition has a velocity of about 100 mph to
200 mph and an initial pressure of about 2 to 5 psi at the air
outlet.

6. A leaf harvester in accordance with claim 5, wherein the
plenum is about 5½ feet wide, encloses an interior volume
of about 0.5 cu. ft., and the upper surface has a slope of about
30°.

7. A leaf harvester in accordance with claim 1, wherein the
forward roller has a diameter of at least about 2 inches.

8. A leaf harvester in accordance with claim 1, wherein the
upper surface comprises a removable upper panel of the
plenum.

9. A leaf harvester in accordance with claim 1, wherein the
leaf cutter, the air conveyor and the first conveyor are
moveably coupled to the mobile vehicle via a common
frame, whereby an operator of the vehicle can raise and
lower the common frame to a desired height above the
ground.

10. A leaf harvester in accordance with claim 1, wherein
the leaf cutter comprises a horizontally oriented bandsaw
having an endless blade, and further comprising a plurality
of blade guides, disposed along a front edge of the air
conveyor, configured for guiding contact with a rear edge of
a lower portion of the blade.

11. A pick-up system for a leaf harvester having a front
and a first conveyor, comprising:

a lower forward end of the first conveyor, having a forward roller;

a leaf cutter, disposed at the front, configured to cut leaves as the harvester moves forwardly;

an air conveyor, disposed between the leaf cutter and the lower forward end of the first conveyor, having a rear wall defining a gap between the air conveyor and the lower forward end;

a rearwardly sloped upper surface; and a forward air outlet, configured to discharge a laminar flow of air rearwardly over the upper surface, whereby cut leaves landing upon the upper surface are propelled across the gap toward the lower forward end of the first conveyor.

12. A pick-up system in accordance with claim 11, the air conveyor further comprising a generally horizontally oriented plenum, having a width and enclosing an interior volume, configured for receiving and equalizing an inlet flow of air prior to discharge from the forward air outlet, to facilitate the laminar flow.

13. A pick-up system in accordance with claim 12, further comprising an air pump, in fluid communication with the interior volume of the plenum, providing a flow rate of from about 2000 SCFM to about 3500 SCFM at the forward air outlet, at a pressure of about 2 to 5 psi and a velocity of about 100 mph to 200 mph across the upper surface.

14. A pick-up system in accordance with claim 11, wherein the leaf cutter, the air conveyor and the first conveyor are attached to a common frame, the common frame being moveably couplable to a harvester vehicle.

15. A pick-up system in accordance with claim 11, wherein the forward roller has a diameter that is at least about 2 inches.

16. An air conveyor system for a leaf harvester having a leaf cutter at a forward end thereof, and a conveyor disposed rearwardly of the leaf cutter, the conveyor having a lower forward end with a forward roller, comprising:

an air pump;

a plenum, disposed between the leaf cutter and the conveyor, in fluid communication with the air pump, and having a rear wall defining a gap between the air conveyor and the lower forward end;

a rearwardly sloped upper surface; and an air outlet, disposed at a font edge of the upper surface, configured to rearwardly discharge a laminar flow of air over the upper surface, whereby cut leaves landing upon the plenum are propelled rearwardly across the gap onto the lower forward end of the conveyor.

17. An air conveyor system in accordance with claim 16, wherein the plenum is about 5½ feet wide, encloses an interior volume of about 0.5 cu. ft., and the upper surface has a slope of about 30°.

18. An air conveyor system in accordance with claim 16, wherein the laminar flow has a velocity of about 100 mph to 200 mph across the upper surface.

19. An air conveyor system in accordance with claim 16, wherein the leaf cutter and the plenum are attached to a common frame, the common frame being moveably couplable to the harvester.

20. An air conveyor system in accordance with claim 16, wherein the upper surface comprises a removable upper panel of the plenum.

* * * * *